US012269920B2

(12) United States Patent
Senoz et al.

(10) Patent No.: US 12,269,920 B2
(45) Date of Patent: Apr. 8, 2025

(54) CONTINUOUS GLYCOLIDE-L-LACTIDE COPOLYMER PRODUCTION PROCESS DEVELOPMENT

(71) Applicant: Ethicon, Inc., Somerville, NJ (US)

(72) Inventors: Erman Senoz, Somerville, NJ (US); Sasa Andjelic, Somerville, NJ (US); Marc Brian Wisnudel, Somerville, NJ (US)

(73) Assignee: Ethicon, Inc., Raritan, NJ (US)

( * ) Notice: Subject to any disclaimer, the term of this patent is extended or adjusted under 35 U.S.C. 154(b) by 705 days.

(21) Appl. No.: 17/313,506

(22) Filed: May 6, 2021

(65) Prior Publication Data

US 2021/0355273 A1 Nov. 18, 2021

Related U.S. Application Data

(60) Provisional application No. 63/022,981, filed on May 11, 2020.

(51) Int. Cl.
| | |
|---|---|
| *C08G 63/78* | (2006.01) |
| *C08G 63/08* | (2006.01) |
| *C08G 63/64* | (2006.01) |
| *C08G 63/82* | (2006.01) |

(52) U.S. Cl.
CPC ........... *C08G 63/785* (2013.01); *C08G 63/08* (2013.01); *C08G 63/64* (2013.01); *C08G 63/823* (2013.01)

(58) Field of Classification Search
CPC ..... C08G 63/08; C08G 63/785; C08G 63/823
See application file for complete search history.

(56) References Cited

U.S. PATENT DOCUMENTS

| | | | | |
|---|---|---|---|---|
| 5,136,017 A | * | 8/1992 | Kharas | C08G 63/08 |
| | | | | 526/67 |
| 2012/0101248 A1 | * | 4/2012 | Matsuba | B01J 19/1818 |
| | | | | 528/272 |
| 2019/0352457 A1 | * | 11/2019 | Mühlbauer | C08G 63/90 |

FOREIGN PATENT DOCUMENTS

| | | |
|---|---|---|
| CN | 107602834 A | 1/2018 |
| EP | 1413592 A2 | 4/2004 |
| EP | 2455414 A1 * 5/2012 | ............. A61L 27/58 |

(Continued)

OTHER PUBLICATIONS

James Bielenberg et al., Apr. 2019, Chemical Engineering and Processing—Process Intensification, vol. 138, pp. 49-54. (Year: 2019).*

(Continued)

*Primary Examiner* — Brieann R Johnston
(74) *Attorney, Agent, or Firm* — David R. Crichton; Leo B. Kriksunov

(57) ABSTRACT

The present invention is directed to continuous reaction processes for preparing a glycolide/L-lactide copolymer formulation by continuously introducing glycolide monomer, L-lactide monomer, initiator and optionally a catalyst into at least one continuous reactor vessel under dry nitrogen environment, wherein the monomers, initiator, and optional catalyst are mixed at a first lower temperature and then transferred to a second continuous reactor operating at a second higher temperature, and then exothermally reacting and maintaining at a steady state, the blend of glycolide monomer, lactide monomer, initiator and optional catalyst to produce a PLGA copolymer reaction product.

8 Claims, 10 Drawing Sheets

(56) References Cited

FOREIGN PATENT DOCUMENTS

| GB | 2277324 A | * | 10/1994 | ............. C08G 63/08 |
|---|---|---|---|---|
| JP | 08259676 A | * | 10/1996 | |
| JP | H107773 A | | 1/1998 | |
| WO | 2010012770 A1 | | 2/2010 | |
| WO | 20210229381 A1 | | 11/2021 | |

OTHER PUBLICATIONS

Machine translation of JP 08259676 (1996, 6 pages).*

Dobrzynski, et al., "Synthesis of Biodegradable Glycolide/L-lactide Copolymers Using Iron Compounds as Initiators", In Polymer, vol. 43 Issue 9 , pp. 2595-2601, Apr. 1, 2002.

Hiemenz, et al., "Polymer Chemistry: The Basic Concepts", In Journal of Polymer Science: Polymer Letters Edition, vol. 22, 736 pages, 1984.

"International Search Report and Written Opinion for PCT Application No. PCT/IB2021/053872", mailed date: Aug. 11, 2021, 15 pages.

Kowalski, et al., "Mechanism of Cyclic Ester Polymerization Initiated with Tin(II) Octoate. 2. Macromolecules Fitted with Tin(II) Alkoxide Species Observed Directly in MALDI-TOF Spectra", In Macromolecules, vol. 33 Issue 3, pp. 689-695, Feb. 8, 2000.

Odile, et al., "Controlled Ring-Opening Polymerization of Lactide and Glycolide", In Chemical Reviews, vol. 104 Issue 12, pp. 6147-6176, Dec. 8, 2004.

Sedush, et al., "Kinetics and Thermodynamics of L-lactide Polymerization Studied by Differential Scanning Calorimetry", In Journal of European Polymer, vol. 62, pp. 198-203, vol. 62, Jan. 1, 2015.

Yu, et al., "Modeling of Molecular Weight Distribution in Ring-Opening Polymerization of L,L-Lactide", In Industrial & Engineering Chemistry Research, vol. 53 Issue 18, pp. 7333-7342, Jan. 10, 2014.

Yu, et al., "Ring-Opening Polymerization of L, L-Lactide: Kinetic and Modeling Study", In Macromolecules Article, vol. 42, Issue 21, pp. 8187-8197, Nov. 10, 2009.

* cited by examiner

CONTINUOUS GLYCOLIDE-L-LACTIDE COPOLYMER PRODUCTION PROCESS DEVELOPMENT

INTRODUCTION

In a conventional method, copolymers, such as glycolide-lactide copolymer (PGLA), are produced by a batch process, wherein a fixed ratio of monomers, catalyst, initiator, and optionally a dye are charged into a batch reactor and heated under a controlled oil-heater temperature profile. The batch reactor is kept at the target oil temperature (or temperature profile) for a target amount of time before the resulting batch reaction product can be extruded, pelletized, and dried. The batch reactor is then allowed to cool and goes through a cleaning cycle before a new batch of raw materials can be added.

BACKGROUND

Yu et al. has reported on a model for polymerization of L-lactide, and noted that the initiation rate constant is >200 times higher than the propagation rate constant. Yu, Y. et al.; Ind. Eng. Chem. Res. 2014, 53, 18, 7333-7342.

A study by Kowalski et al. also indicated that a reaction between stannous octoate and hydroxyl containing initiator causes the formation of an active site, which later becomes a source for propagation reactions. Kowalski, A., Duda, A., and Penczek, S.; Macromolecules 2000, 33, 3, 689-695.

Dechy-Cabaret et al. states that the homopolymerization reactivity ratio of glycolide to L-lactide as is close to 10. Odile Dechy-Cabaret, Blanca Martin-Vaca, and, and Didier Bourissou, Chemical Reviews 2004 104 (12), 6147-6176.

Additional Background Material can be found in Sedush, N. G., Chvalun, S. N.; European Polymer Journal, 62, January 2015, 198; Yu, Y., Storti G., Morbidelli, M.; Macromolecules, 2009, 42, 8187-8197; Hiemenz, P. C.; Polymer Chemistry: The Basic Concepts; 1984; Equation 7.15.

SUMMARY OF THE INVENTION

This invention relates to a continuous process where copolymer can be produced, thereby reducing costs and improving product quality over polymer made in a batch process. Preferably, this copolymer has a glycolide to L-lactide mol % ratio between 95-5 and 85-15. More preferably, the copolymer has 95-5 to 10-90 glycolide to L-lactide mol % ratio. This document also discloses kinetics data, obtained by a batch process, which has utility in designing a continuous polymerization process.

DETAILED DESCRIPTION

Figure 1:
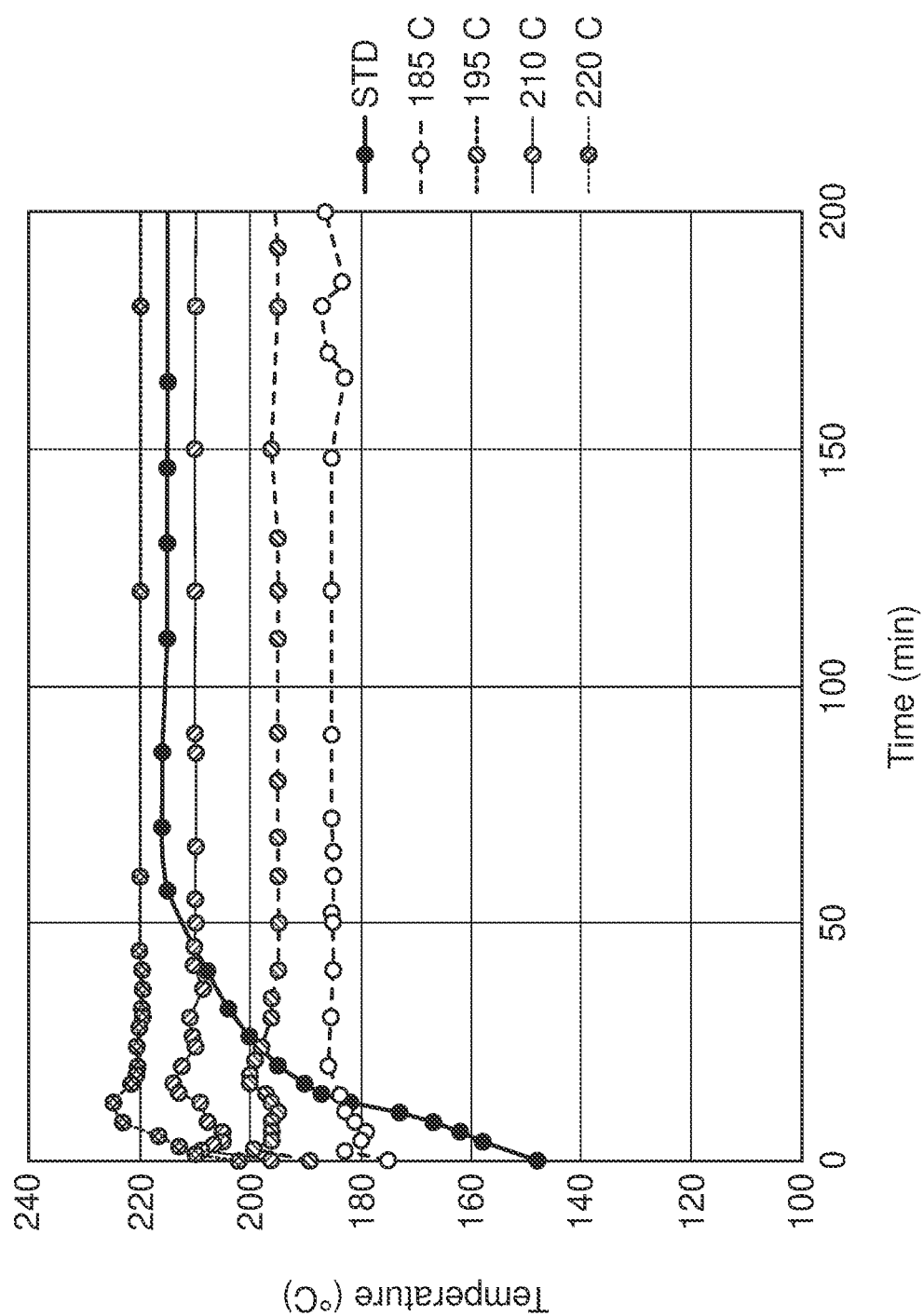
FIG. 1 illustrates batch reactor temperature profiles.

Considering the trends of the monomer consumption in our experiments and the literature for ring-opening polymerization, we hypothesize that the polymerization is initiated by the interaction of catalyst and initiator. An active monomer site is formed as a result of this fast initiation stage. A propagation stage is followed by the initiation in a chain growth type of polymerization mechanism. In this stage, active sites react with an available monomer causing ring opening polymerization.

The propagation stage takes into account the interactions of individual monomers, glycolide and L-lactide and is slower compared to the initiation stage. The following assumptions were taken in the model:

a) The reactor provides perfect mixing where mass transfer is not rate limiting.
b) The reactions are irreversible.
c) All polymer chains were initiated by the reaction of an initiator molecule.
d) The propagation is significantly slower compared to the initiation stage.
e) Reactivity ratios do not change with temperature.

The reactions are illustrated in the reaction scheme below, where Gly is for glycolide, Lac is for L-lactide, In is for Initiator and Cat is for catalyst.

| | Assumptions |
|---|---|
| Initiation | |
| Gly + In + Cat → Gly• + Cat | Fast, Irreversible |
| Lac + In + Cat → Lac• + Cat | |
| Propagation | |
| -Gly• + Lac + Cat $\xrightarrow{k_{GL}}$ -GlyLac• + Cat | Fast, Irreversible |
| -Gly• + Gly + Cat $\xrightarrow{k_{GG}}$ -GlyGly• + Cat | |
| -Lac• + Lac + Cat $\xrightarrow{k_{LL}}$ -LacLac• + Cat | |
| -Lac• + Gly + Cat $\xrightarrow{k_{LG}}$ -LacGly• + Cat | |

Based on the rate determining propagation step, following rate equations were written to quantify the monomer consumption rates.

$$r_{Gly} = \frac{d[Gly]}{dt} = -k_{GG}[Gly][Gly\cdot] - k_{GL}[Gly][Lac\cdot]$$

$$r_{Lac} = \frac{d[Lac]}{dt} = -k_{LL}[Lac][Lac\cdot] - k_{LG}[Lac][Gly\cdot]$$

In these equations, the rate constants k, are a function of temperature and are obtained through data-model regression. Glycolide and L-lactide concentrations, [Gly] and [Lac], are measured during the experiments. However, the concentration of active sites at the end of polymer chains, [Gly•] and [Lac•], are not measured. Therefore, it was necessary to express these concentrations in terms of measured values. Monomers are added to the end of the chain one by one during the propagation phase of the polymerization. At any instant, the concentration of the active end group sites should be proportional to the consumption rate of that particular monomer. Therefore, the ratio of the active monomer sites at any given time is expressed by the following equation.

$$\frac{[Lac\cdot]}{[Gly\cdot]} = \frac{\frac{d[Lac]}{dt}}{\frac{d[Gly]}{dt}} = \frac{d[Lac]}{d[Gly]}$$

$$[Lac\cdot] = [Gly\cdot]\frac{d[Lac]}{d[Gly]}$$

Theoretically, the total number of active sites are equal to the number of initiator molecules used in the system.

[Lac•]+[Gly•]=[In]

Rearranging the equations above gives the following expressions for the concentration of active sites:

$$[Lac\cdot] = \frac{[In]}{1 + \frac{d[Gly]}{d[Lac]}}$$

$$[Gly\cdot] = \frac{[In]}{1 + \frac{d[Lac]}{d[Gly]}}$$

Inserting these into the main rate equation gives us the following rate equations.

$$\frac{d[Gly]}{dt} = -k_{GG}[Gly]\frac{[In]}{1 + \frac{d[Lac]}{d[Gly]}} - k_{GL}[Gly]\frac{[In]}{1 + \frac{d[Gly]}{d[Lac]}}$$

$$\frac{d[Lac]}{dt} = -k_{LL}[Lac]\frac{[In]}{1 + \frac{d[Gly]}{d[Lac]}} - k_{LG}[Lac]\frac{[In]}{1 + \frac{d[Lac]}{d[Gly]}}$$

The initial conditions for a copolymerization system consist of the monomer concentrations and the ratio of monomer consumptions rates. The initial concentrations for a 90:10 glycolide:L-lactide system are given below:

$[Gly]_0$=9.636 gmol/L $[Lac]_0$=1.093 gmol/L

The initial condition for the ratio of consumption of monomers was determined by assuming that below equation is true at the beginning of the reaction. Hiemenz [Hiemenz, P. C.; Polymer Chemistry: The Basic Concepts; 1984] explains the use of this equation in copolymerization at fixed monomer ratios. Inserting the initial concentrations into the initial condition equations also gives us the value of this ratio.

$$\frac{d[Lac]}{d[Gly]_0} = \frac{1 + r_L\frac{[Lac]}{[Gly]_0}}{1 + r_G\frac{[Gly]}{[Lac]_0}} = 0.037$$

It was targeted to fit the extent of reaction based on glycolide and L-lactide data to the reaction rate equation we derived above. The monomer reactivity ratios, $r_G$ and $r_L$ were used below in order to lower the degrees of freedom in our data fitting.

$$r_G = \frac{k_{GG}}{k_{GL}} = 3, r_L = \frac{k_{LL}}{k_{LG}} = 0.22$$

FIGS. 5-8 shows the comparison of the experimental data vs kinetics model for the extent of reaction based on glycolide and L-lactide with time at varied temperatures.

Reactor Design and Process Flow

As demonstrated above, and an inventive aspect of this disclosure, the glycolide-lactide copolymer reaction kinetics model formulates the reaction rate accurately, up to 70-90% glycolide conversion, and to 25-45% L-lactide conversion. The utility of this model now can be demonstrated as follows for designing a new polymerization method for glycolide-lactide copolymer polymer. Therefore, it is now possible to design continuous polymerization process for glycolide-lactide copolymer, determine the size of the polymerization reactors (vessels), throughput, and predicted conversion values up to the accuracy or conversion limitations of the model (as the model can formulate the reaction rate in terms of initiator, monomer concentrations and temperature.) For conversions higher than these levels, experimental trials need to be conducted at varied mixing and shear rates. However, the model greatly reduces the time and cost associated with designing a new polymerization process.

Homogenizing Mixer:

The first important constraint in the initial part of the process design is the apparent decrease in Mw (molecular weight) and IV (inherent viscosity) values observed during the reaction kinetics experiments. (That is, that the injection of the catalyst solution and the initiator into a hot monomer melt results in low molecular weight.) Therefore, the design includes a homogenizer as the first unit operation, where monomers, catalyst solution, and initiator are mixed at low temperature below the reaction temperatures (75-120° C. more preferably 85-95° C.). There is very low or no copolymer conversion in this first stage. A limited amount of reaction can happen in this vessel. This homogenization or mixing stage can be accomplished in a continuous process where the ingredients are continuously added, and the homogenized mix is continuously removed. Alternatively, homogenization step can be done in a semi-batch process in two or more alternating reactors, to lock in the product composition.

Continuous Prepolymer Reactors:

The homogenizers feed a continuous reactor or a series of continuous reactors that operates at a constant batch temperature between 140 to 230° C. to polymerize the prepolymer. Preferably, they operate at between 150-215° C. In a preferred embodiment, the continuous reactor is a continuous stirred tank reactor (CSTR). The conversion in these reactor/s will be limited up to 80% for glycolide and 45% for lactide, so that the reactor can operate in highly efficient mixing conditions. Preferably, the final conversion will be between 30% and 80% glycolide and 25 and 45% L-lactide. The viscosity of the prepolymer in these conversion values allows for good mixing and conveyance of the material to the next stage of the continuous process. The continuous reactor(s) is equipped with sufficient agitator and baffle combinations, so that the feed will not have the chance to channel/shortcut into the exit stream easily. The reaction exotherm needs to be controlled either by internal cooling coils or by providing sufficiently low jacket temperatures, to compensate for the exotherm. The reaction kinetics model was used to calculate the average residence time requirements for this reactor, t.

$$\tau = \frac{V_R}{Q_f} = \frac{[Gly]_f - [Gly]}{r_{Gly}}$$

where, $[Gly]_f$ is the feed glycolide concentration and $[Gly]$ is the glycolide in the exit stream.

For illustrative purposes, the residence time and conversion were calculated for specific conditions including temperature and residence times. A CSTR operating at 215° C. will require 40 mins average residence time to reach 80% glycolide and 45% L-lactide conversion. In comparison, two CSTRs in series with 12 min average residence time each can achieve the same conversion. In this reactor combination, the first CSTR will bring the glycolide conversion to 56% and the second one will drive the reaction further up to 80% glycolide conversion.

The biggest disadvantage of CSTRs is the increase in polydispersity index (PDI) or heterogeneity index, which is a measure of the distribution of molecular mass in a given polymer sample. PDI (defined as Mw/Mn or the ratio of the weight average molecular weight to the number average molecular weight of the polymer) is due to the mixing of the fresh feed with already polymerized reactor contents. Using a series of CSTRs can alleviate the molecular weight distribution broadening effect (typically characterized as an increase in PDI), as this would isolate the partially converted polymer, avoiding back-mixing. Based on the PDI requirement for the product, the number of CSTRs in series can be increased or decreased.

Plug Flow Reactor (PFR):

The product from the continuous reactor(s) (eg. CSTR) is fed into a plug flow reactor (PFR) where the conversion and the mixture viscosity are increased, and the back-mixing is limited by design. The PFR can be an extruder, horizontal mixer, horizontal kneader reactor or any other suitable reactor with long residence time. Preferably, the PFR is a horizontal kneader type of reactor, where the product is conveyed, mixed continuously and the conversion is increased as the product moves along the length of the reactor. A critical requirement for this reactor is the long residence time. Based on the final design a residence time of 20 minutes to 4 hours is required to complete the polymerization in the polymerization temperature range of 200-230° C. Preferably, the temperature range is 210-220° C. The mixing efficiency in this equipment is very critical to determine the residence time requirement. Preferably, this PFR type equipment contains large free volume and vacuum capability to remove volatiles in order to ease the downstream drying process. The vacuum should be applied rather to the final part of the equipment or downstream from the reaction zone in order to minimize the loss of monomer content.

In one embodiment, the PFR reactor operates with shorter residence time (20-45 mins) in the temperature range of 210-220° C. with good devolatilization capability. The peak polymer molecular weight can be achieved within this short residence time; however, the monomer conversion does not reach the target conversion of 99% glycolide and 78% L-lactide. In this process, the conversion values can reach approximately in the 90-94% range for glycolide and the 52-58% range for L-lactide, and the devolatilization removes the excess glycolide and L-lactide, thereby purifying the product. The devolatilization can also be done separately by a subsequent devolatilization process, as well. The process suggested in this embodiment prevents thermal degradation, color change and MW drop that can result from long residence times.

Figure 10:
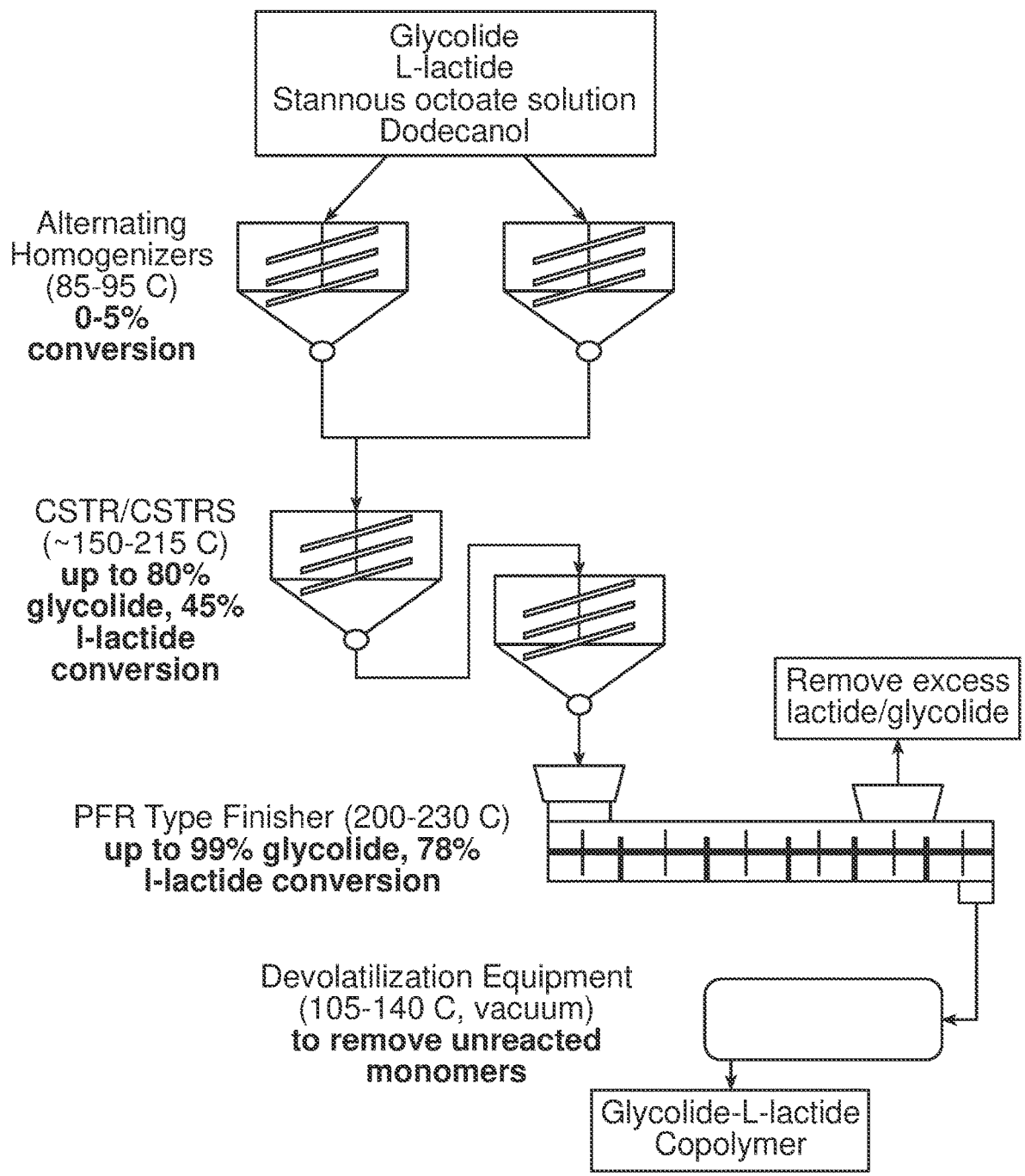
FIG. 10 illustrates the overall process flow.

In another embodiment, PFR reactor operates by the process explained in the embodiment above. The homogenizer reactor is fed some excess L-lactide such that the final polymer composition is 90% glycolide and 10% L-lactide at the end of the process. The homogenizer feed can similarly feed CSTR reactors and then, CSTRs can feed the PFR similar to the process mentioned in the embodiment above. The amount of extra L-lactide for this purpose can be adjusted based on the CSTR-PFR configurations, processing conditions and process flow. For example, the feed can have 85 mol % glycolide and 15% L-lactide. The final polymer glycolide:L-lactide ratio can be 90-10 mol ratio after removing L-lactide from the final monomer-polymer mixture. The overall process flow is demonstrated in FIG. 10.

Data-model comparison show that the model can predict monomer conversion up to 70-90% glycolide conversion in terms of temperature, monomer and initiator concentrations. The rate equation of the model takes into account all the ingredients but catalyst. The catalyst directly affects the activation energy, Ea, term. If the catalyst is increased, it lowers the Ea, increasing the reaction rate.

Addition of catalyst/initiator into hot monomer melt caused low MW, consequently it was recommended to mix catalyst/initiator with monomers at low temperature. This can be done by a homogenizer equipment that operates at lower than reaction temperatures (30-120° C.). Without intending to be limited to a theory, the reason for a lower temperature might be high reactivity of the initiator and catalyst or poor dispersion of them into the monomer in a short period of time.

The observations during experiments and data suggest that a process with CSTR series followed by a PFR type of reactor is the most preferred. Due to the viscosity and the mixing efficiency limitations, it is suggested to use CSTR type reactors up to 80% glycolide and 45% L-lactide conversion. CSTRs may cause broadening of the molecular weight distribution. To mitigate this, a suitable number of CSTRs in series can be utilized based on the PDI requirement of the final polymer. PFR needs a residence time of 30 min to 2 hours. A conventional twin-screw extruder will not accomplish this in a practical configuration. A more specialized PFR type of equipment that can handle high viscosities, with very low back mixing and good agitation is key for successful production.

In summary this document discloses three inventive aspects:
1. The observation that higher molecular weight occurs at lower catalyst-initiator mixing temperatures.

2. Model developed that predicts polymerization conversion up to 70-90% glycolide and 25-45% L-lactide based on the temperature.
3. Model predicts aspects of a multi-stage continuous polymerization method involving first mixing at a low temperature (75-120° C. more preferably 85-95° C.), then reaction at a higher temperature (140-230° C. preferably 150-215° C.) in a series of CSTR type of reactors (1 or higher) up to 70-90% glycolide conversion, a finishing reaction in a PFR type of reactor with glycolide conversion greater than 98% and finally an optional devolatilization step. Recommended reactor residence times were estimated based on the reaction kinetics.

Experimental Results

A reaction kinetics study is essential to determine the rate of reaction in terms of the process parameters and eventually, to design reactors that can achieve the desired reaction conversions. In this regard, a series of experiments were conducted. For this kinetics study, a two and half (2.5) gallon conical 8CV reactor with dual helical agitators was used at 10 rpm. The conical reactor was charged with six (6) kg of a 90:10 mol ratio glycolide:lactide monomer mixture. The monomer to catalyst mole ratio was 62500 and the monomer to initiator (dodecanol) ratio was 800 in all of the experimental runs. Table 1 shows the actual amounts used in the experiments. The catalyst solution used in the experiments was prepared by mixing >90% purity stannous octoate with dry toluene. The concentration of the catalyst was 126 grams $Sn(Oc)_2$/L solution.

TABLE 1

| Ingredient | Amount |
|---|---|
| Glycolide | 5259 g |
| L-lactide | 740.77 g |
| Dodecanol | 14.14 ml |
| Stannous Octoate Solution | 2.45 ml |

After successive application of a vacuum at below 1 Torr and nitrogen ($N_2$) gas purge, the monomer mixture was heated to a catalyst addition temperature (See Table 2) in the sealed reactor. The initiator and catalyst were then injected when the batch temperature in the reactor was stable within ±1 C. The initiator, and a few minutes later the catalyst solution were injected in the reactor by separate syringes. This starting catalyst addition temperatures are intentionally set lower than the batch reaction temperature due to expectation of a sudden exothermic reaction. The addition of catalyst caused a fast exothermic reaction, which produces a large temperature jump within the reactor in a few minutes. Table 2 shows the catalyst addition temperature and reaction temperatures used in the experiments.

TABLE 2

| Reactor Batch Temperature (° C.) | Catalyst Addition Temperature (° C.) |
|---|---|
| 185 | 175 |
| 195 | 188 |
| 210 | 195 |
| 220 | 202 |

During the exothermic reaction phase, the batch reactor temperature was controlled and maintained at a set steady state reaction temperature within ±5° C. by rapidly modifying the reactor jacket temperature. The batch reactor temperature profiles in these experiments are shown in FIG. 1, wherein "t=0" time is defined as the time in the process at which the first conversion of the monomers to polymer was detected. For comparison purposes, a standard 90:10 glycolide:L-lactide copolymer batch production temperature profile is also included in FIG. 1.

Samples were taken from the reactor in regular intervals to conduct for monomer conversion, molecular weight, inherent viscosity (IV) and polydispersity index (PDI) analysis. PDI is defined as the ratio of weight average molecular weight (Mw) to number average molecular weight (Mn). An in-situ near-IR (NIR) probe was used to measure the conversion of monomers to polymer at <90% conversion in real processing time. Nuclear Magnetic Resonance (NMR) analysis of samples provided the monomer conversion above 90%. Gel Permeation Chromatography (GPC) was used for the molecular weight and PDI analysis.

Results and Discussion

Figure 2:
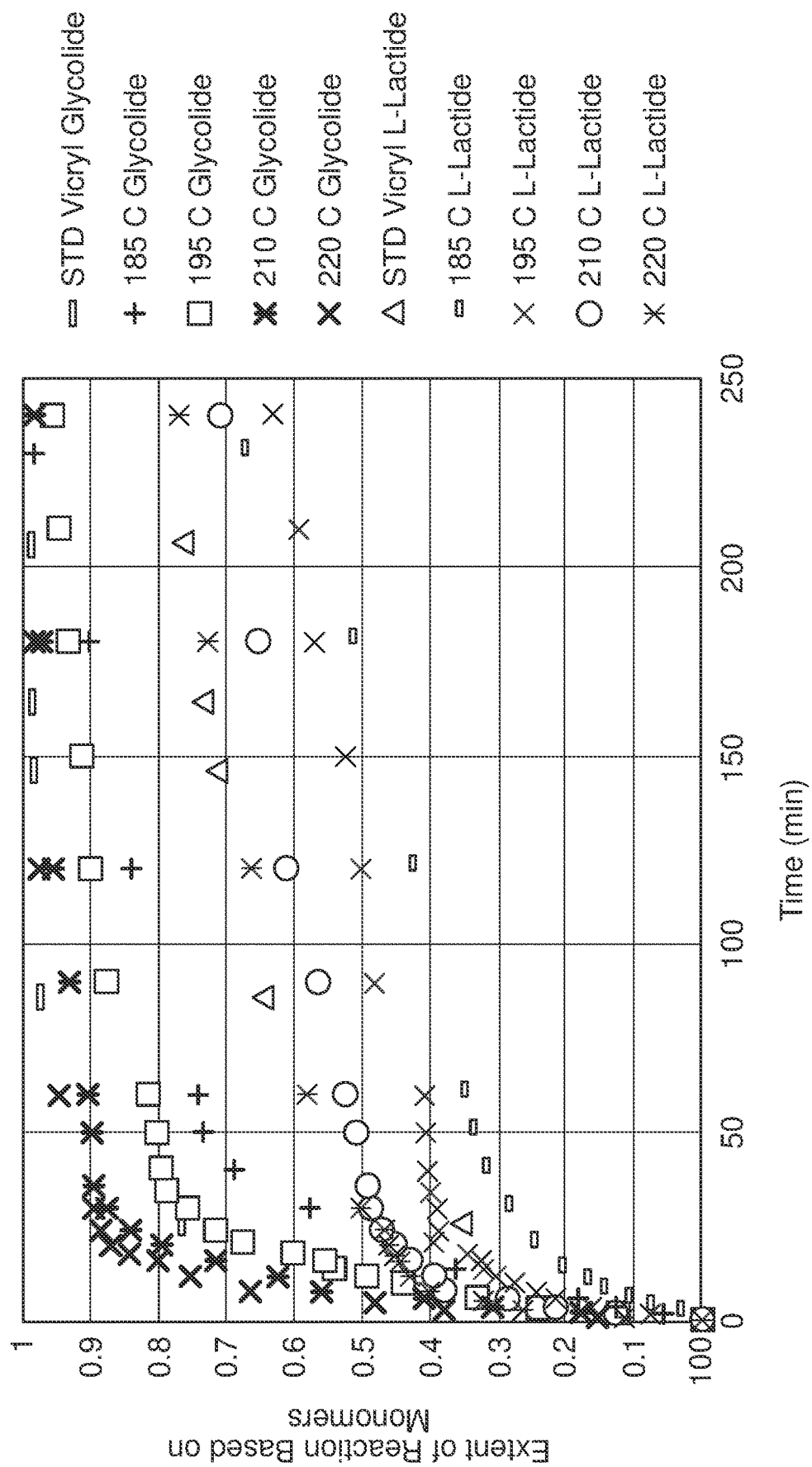
FIG. 2 is a graphical representation of the extent of reaction based on monomer conversions with respect to time at different temperatures.

FIG. 2 shows the extent of reaction based on monomer conversions with respect to time at different temperatures. We defined the extent of reaction, θ, as the ratio of the number of consumed moles of a particular monomer to the total number of moles at the beginning of the reaction. Therefore, when θ=0, there is no reaction and when θ=1, all the particular monomer is converted to polymer. It can be defined as below in terms of the measured numbers in the experiment, where $[M]_0$ is the initial monomer concentration (M can be glycolide or L-lactide) and [M] is the concentration of the monomer at any given time.

$$\theta_M = \frac{[M]_0 - [M]}{[M]_0}$$

In FIG. 2 in addition to the isothermal experiments, a standard 90:10 glycolide:L-lactide copolymer batch process run was also included for comparison purposes with the original process. In the standard batch trial, monomers, catalyst and initiator were added at room temperature and all the ingredients were heated over time until reaching 215° C. Then, the temperature was kept constant at 215° C.

Figure 3:
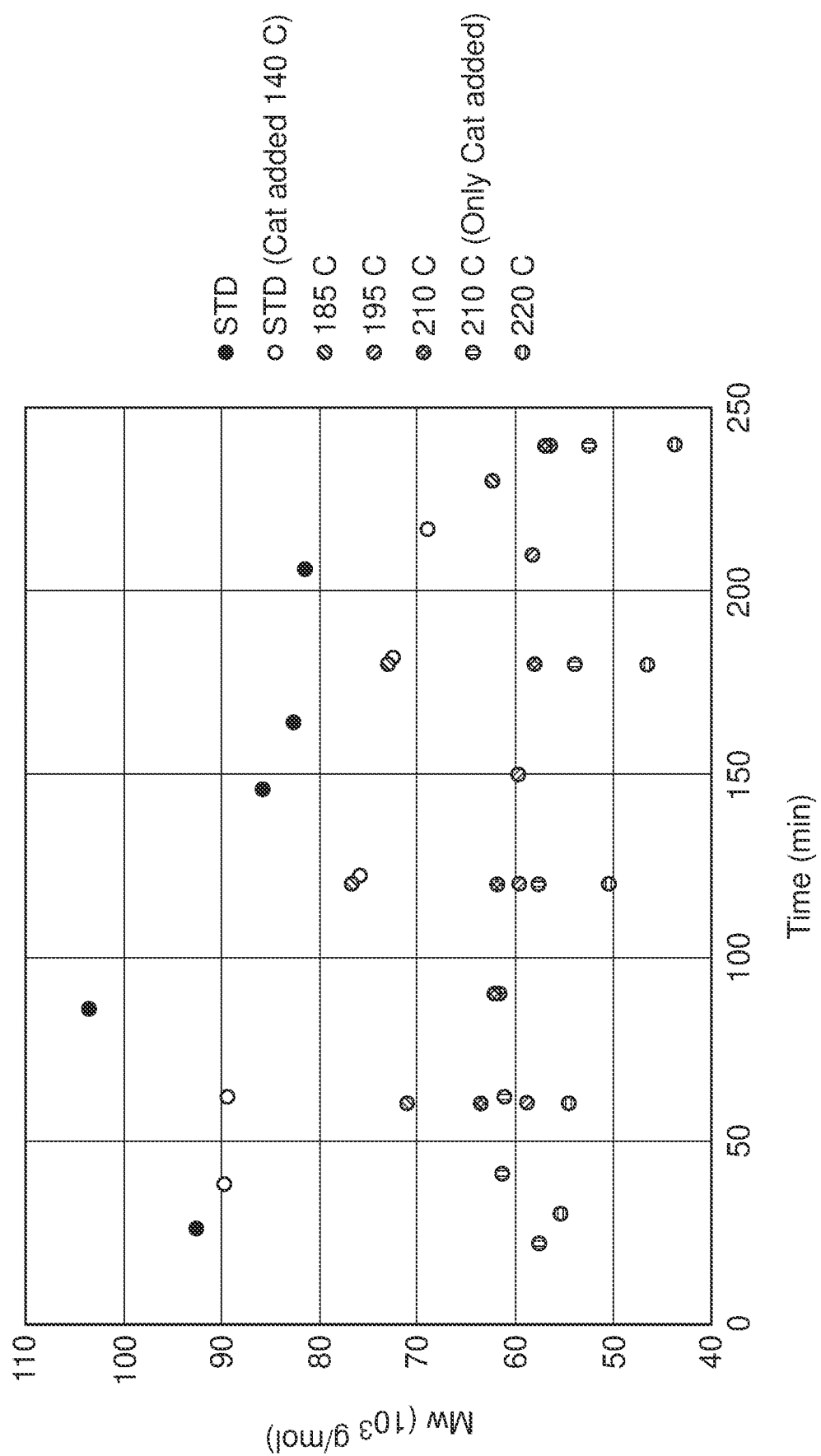
FIG. 3 illustrates the weight average molecular weight of the polymer formed with respect to time at different temperatures, and separately in standard 90:10 glycolide:L-lactide copolymer batch process.
Figure 4:
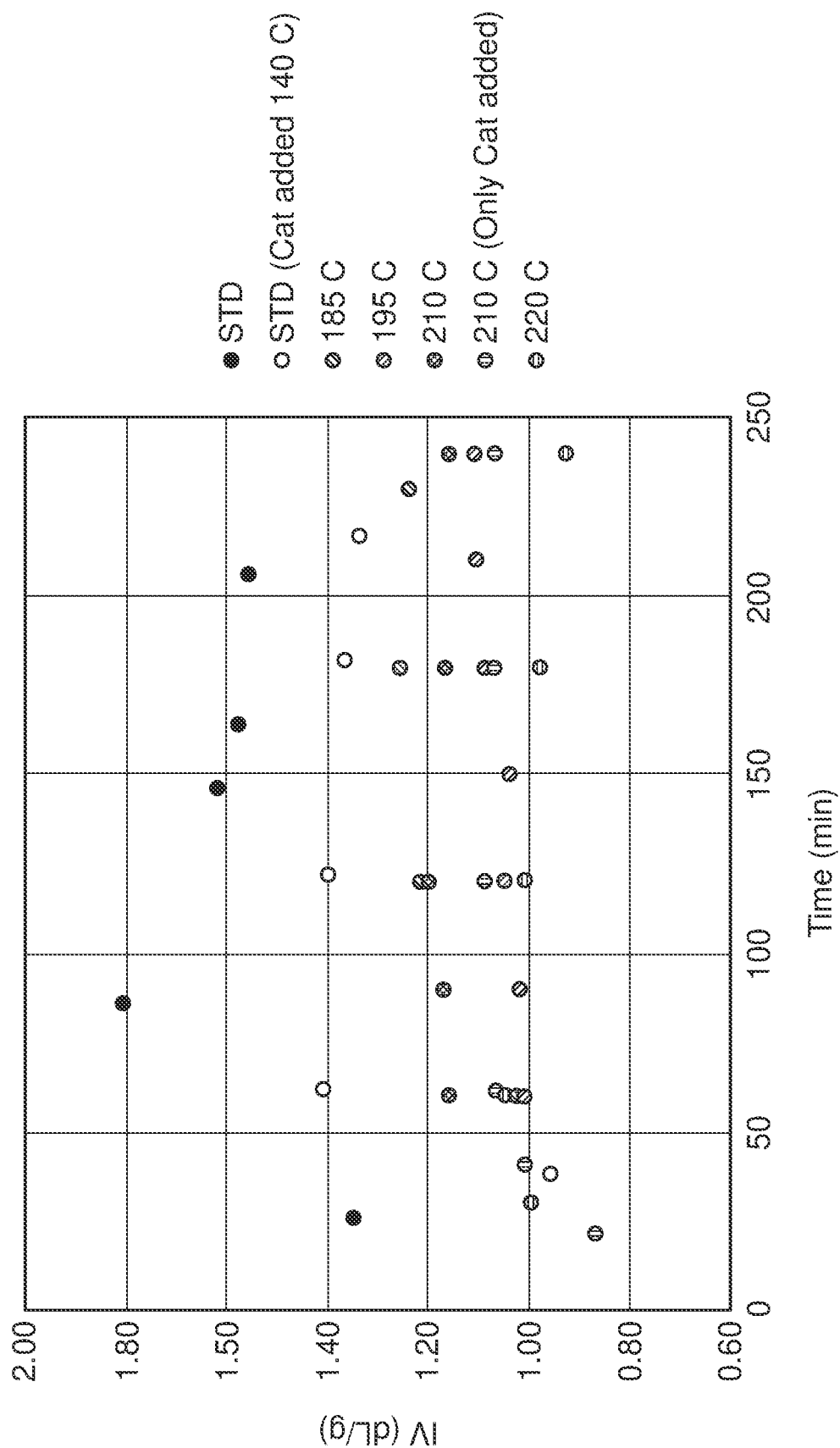
FIG. 4 illustrates the inherent viscosity of the polymer formed with respect to time at different temperatures, and separately in standard 90:10 glycolide:L-lactide copolymer batch process.
Figure 5:
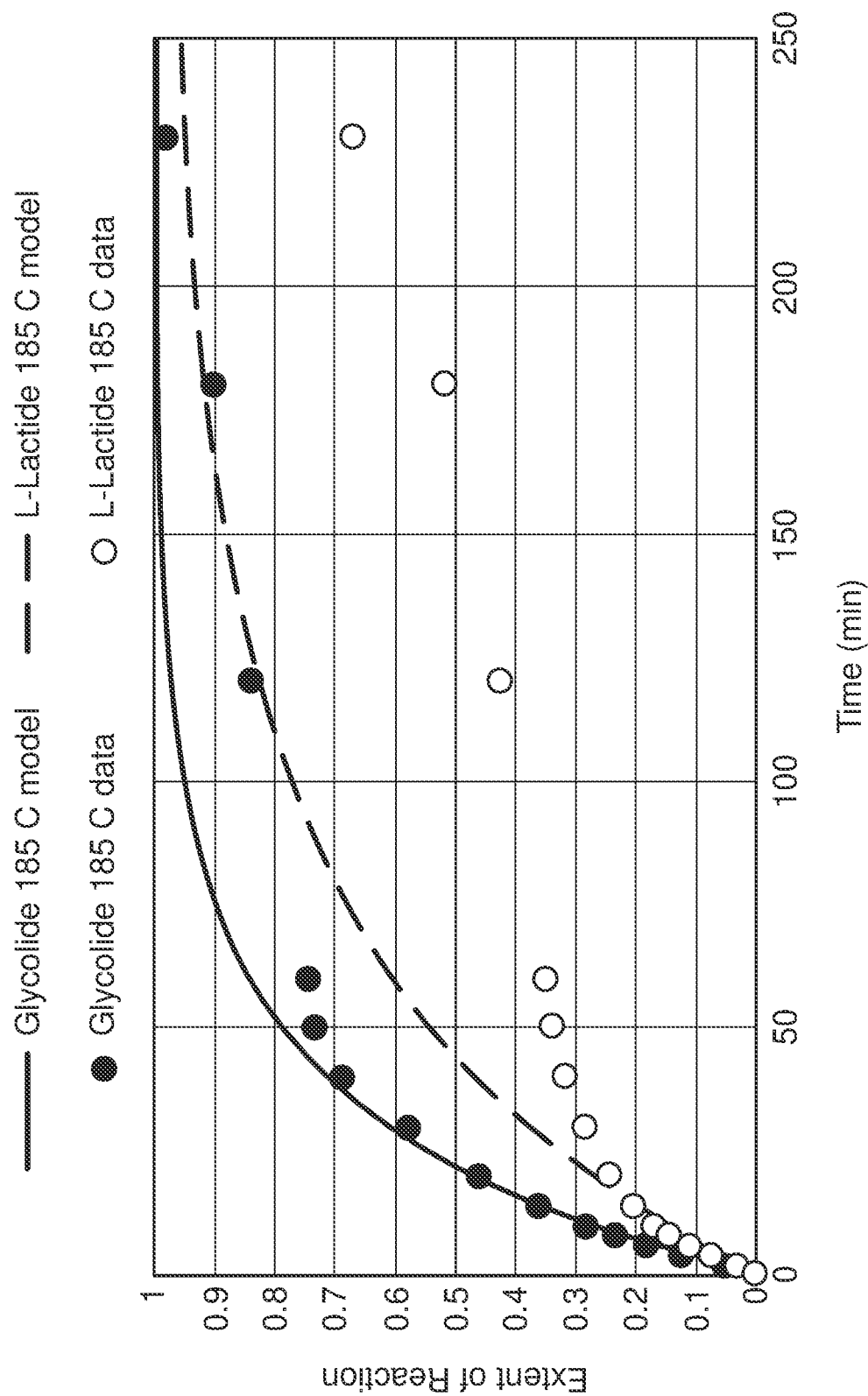
FIG. 5 illustrates the extent of reaction over time for glycolide and L-lactide at 185° C.
Figure 6:
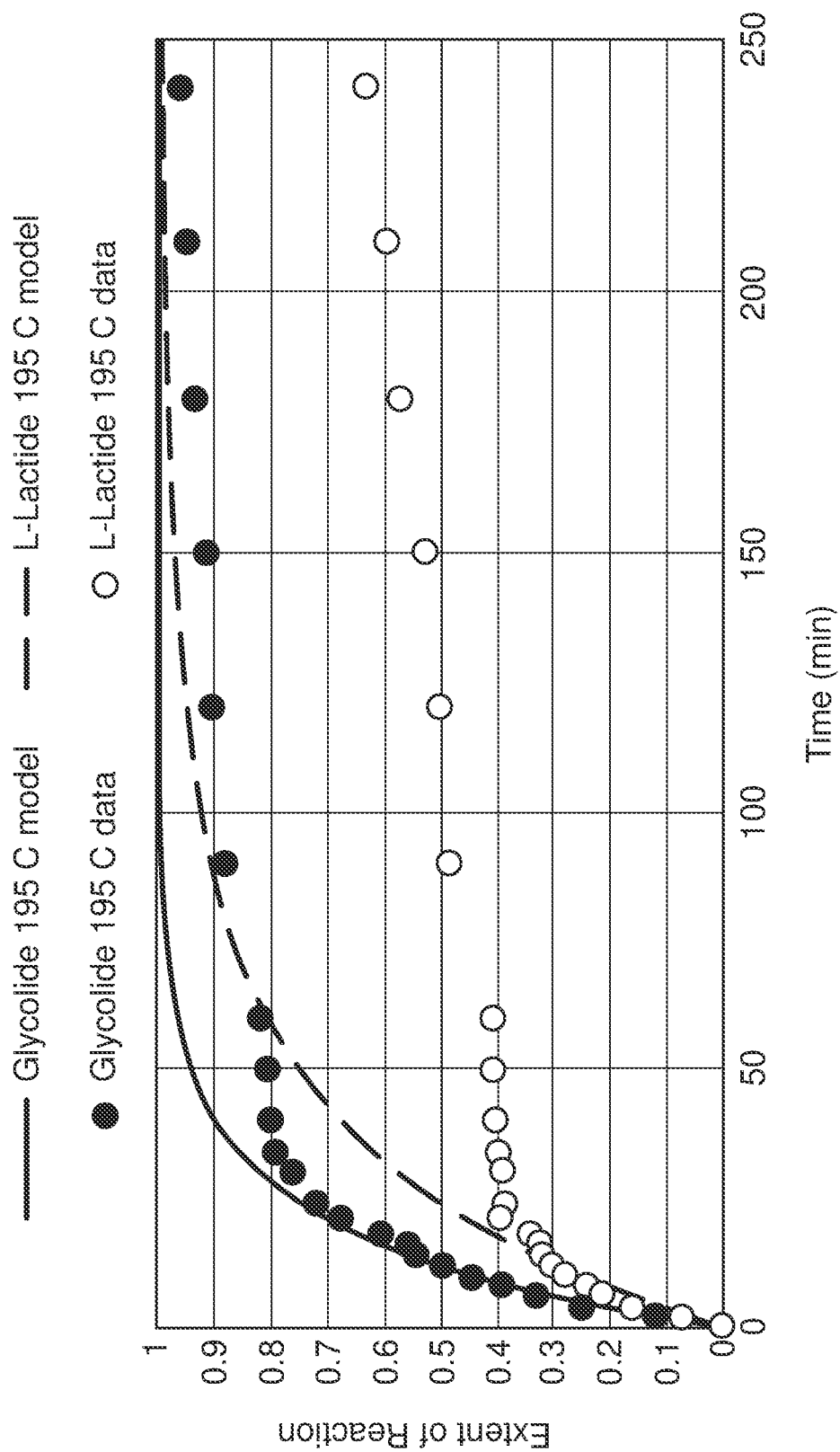
FIG. 6 illustrates the extent of reaction over time for glycolide and L-lactide at 195° C.
Figure 7:
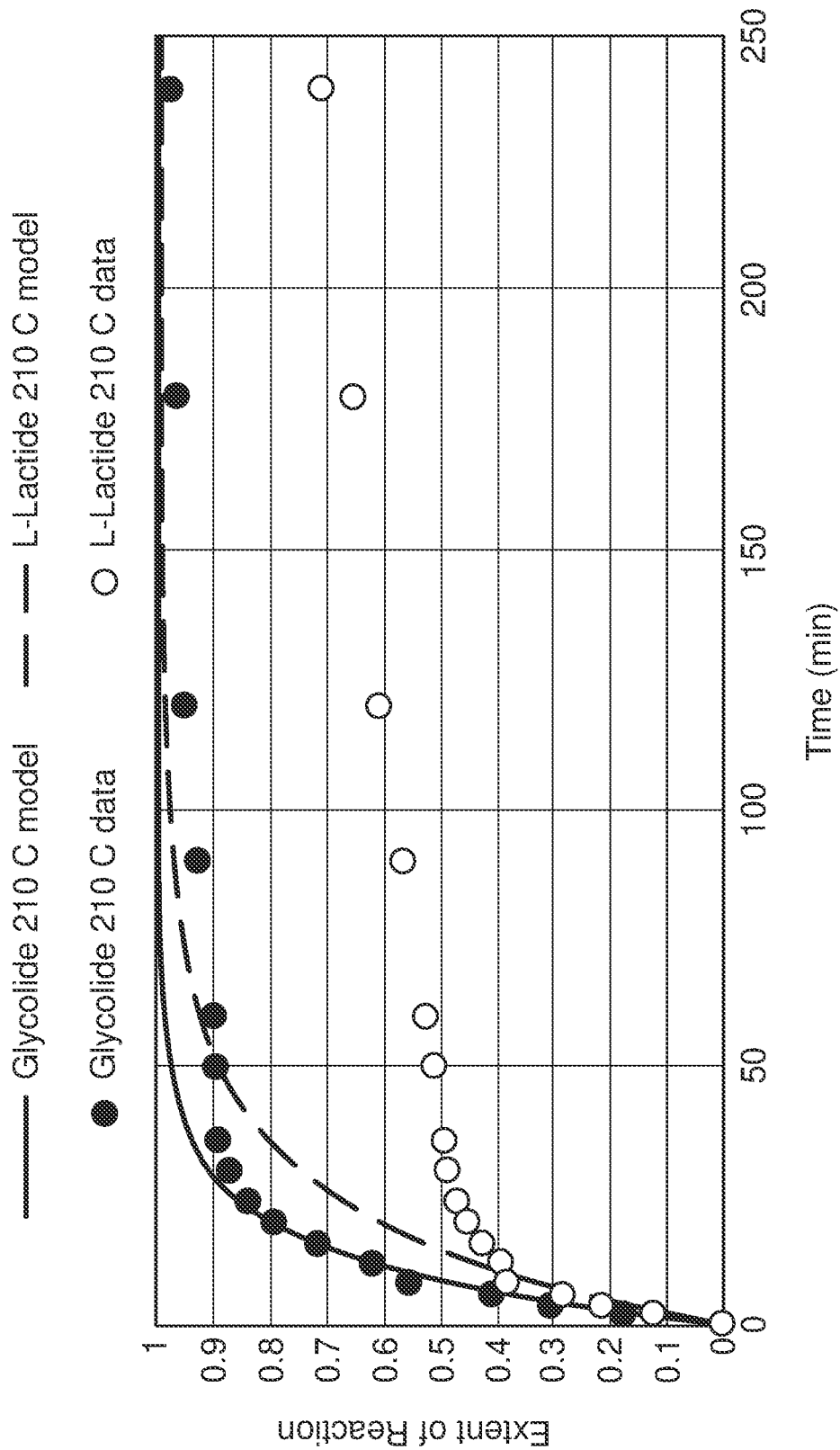
FIG. 7 illustrates the extent of reaction over time for glycolide and L-lactide at 210° C.
Figure 8:
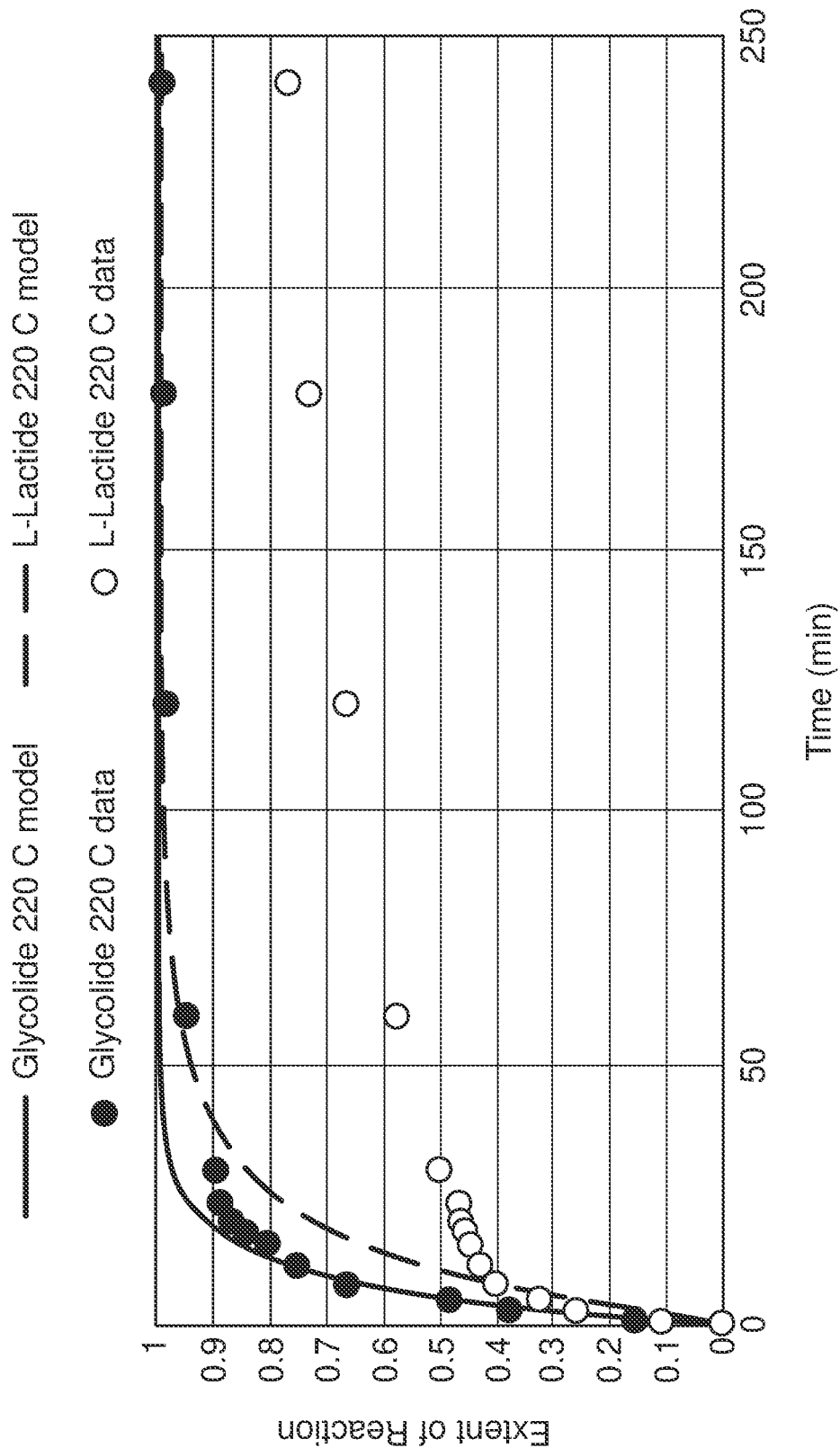
FIG. 8 illustrates the extent of reaction over time for glycolide and L-lactide at 220° C.

The conversion rate increases as the temperature is increased, as predicted by the Arrhenius equation. FIG. 2 demonstrates that glycolide monomer reacts much faster than the L-lactide monomer. This finding suggests that the polymerization-starting end of the polymer chain is abundant in glycolide and the mole concentration of glycolide in the polymer is >90%. As the chains grow longer more L-lactide can attach to the backbone. The opposite end of the polymer chain has <90% glycolide. While glycolide reaches 98.6% conversion after 4 hours of reaction time at 210° C., only 71.4% of the initial L-lactide is converted into polymer backbone. FIG. 3 and FIG. 4 demonstrate the weight average molecular weight and inherent viscosity of the polymer formed with respect to time at different temperatures, and separately in standard 90:10 glycolide:L-lactide copolymer batch process.

Surprisingly, it is evident that the standard 90:10 glycolide:L-lactide copolymer batch process polymerization procedure produces a copolymer product having higher MW and IV compared to the reaction kinetics work runs, where the initiator and catalyst were added into the reactor at the reaction temperature. Moreover, as the temperature at which the catalyst and initiator are added increases, the MW and IV of the final copolymer decreases. Isothermal batch experiment at 220° C. resulted in an IV of 0.93, while 185° C. experiment yielded an IV of 1.24. As it is preferable to have a higher IV polymer for good product performance, it is preferred to run the isothermal batch polymerization at lower temperatures (at 185° C. instead of 220° C.). Furthermore, a monomer conversion was not detected after initiator addition in any of the isothermal experiments. Only after the catalyst addition could an exotherm and monomer conversion could be detected.

We hypothesize that an initiation reaction takes place between catalyst and initiator, where active sites start forming. The initiation reaction allows for the propagation step. It is further hypothesized that high temperatures result in increased number of initiation sites which causes lower MW and IV. Therefore, it is critical to stay at lower temperatures during initiation or during mixing of the initiator and catalyst. The implication for a continuous process is that it is preferable that catalyst, initiator and monomer mixing occur in a first step at a relatively low temperature (eg at 75-120° C.). Then, in a following step, the mixture is heated further (eg. to 210-220° C.) for the remainder of the polymerization process.

In FIGS. 3 and 4 we showed two more series of data. In the first one, the catalyst and initiator were first mixed with glycolide and L-lactide monomer at 140° C., as is done in a standard glycolide-L-lactide copolymer batch polymerization procedure. After a five (5) minute wait at 140° C., the temperature was ramped to 215° C., similar to a standard glycolide-L-lactide copolymer batch polymerization temperature profile. The MW and IV of the final resulting polymer in this case was lower than the standard glycolide-L-lactide copolymerization batch run. However, the MW and IV values were higher than in any of the isothermal kinetics runs, supporting the hypothesis that the low temperature catalyst-initiator activation step is critical to achieve high molecular weights. In the second one, initiator was already included in the initial mix and only catalyst was added at 210° C. to initiate the reaction. This also gave low MW and IV results. This supports one of the inventive embodiments of this disclosure, which is the unexpected finding that higher molecular weight can be achieved in a continuous glycolide-lactide copolymerization process by having an initial catalyst-initiator activation step at one temperature which is lower than the second polymerization temperature.

Surprisingly, the experimental extent of reaction data showed a good fit to the model using the initial part of the reaction. This is particularly evident as the reaction mixture had very low viscosity and perfect mixing assumption is readily valid. As is indicated here, this demonstrates another inventive embodiment of this disclosure, which is a model that predicts the rate of conversion of glycolide in a polymerization with L-lactide up to about 70-90% conversion (of glycolide).

The model overestimates the data at higher conversions. For instance, at 185° C., the model could predict the data up to 70% glycolide conversion. The prediction was good up to 80% glycolide conversion at 195° C. and 90% glycolide conversion at 210 and 220° C. Only up to 25-45% L-lactide converted in this good prediction time interval. We believe the deviation of the model occur due to a few reasons. Firstly, above the aforementioned monomer conversions, the viscosity of the monomer melt gets too high to allow for a perfect mixing environment. The mass transfer rate and mixing rate becomes critical to reach higher conversions. In our experiments we used the maximum allowable mixing speed of 10 rpm. Secondly, in this work we assumed irreversible reaction kinetics for simplicity, and this is a good assumption for glycolide. However, 2-6% L-lactide generally remains unreacted in the experiments due to the thermodynamic equilibrium between monomer and polymer. Lastly, we did not include any degradation type of reaction in the model. Any reaction other than the propagation reaction can result in deviation from the model.

The rate constants in Table 3 were obtained as a result of fitting the model to the experimental data obtained from the experiments at 185, 195, 210 and 220° C.

TABLE 3

| Rxn Temperature (° C.) | $k_{GG}$ (L/gmol·min) | $k_{LL}$ (L/gmol·min) | $k_{GL}$ (L/gmol·min) | $k_{LG}$ (L/gmol·min) |
|---|---|---|---|---|
| 185 | 2.45 | 0.27 | 0.82 | 1.23 |
| 195 | 4.5 | 0.5 | 1.50 | 2.27 |
| 210 | 6.4 | 0.82 | 2.13 | 3.73 |
| 220 | 9.5 | 1.1 | 3.17 | 5.00 |

The rate constants at different temperatures were inserted into the Arrhenius equation below to calculate the activation energy, Ea, and Arrhenius constants, A, so that the reaction rate can be expressed in terms of temperature.

$$k = A \exp\left(\frac{E_a}{RT}\right)$$

Figure 9:
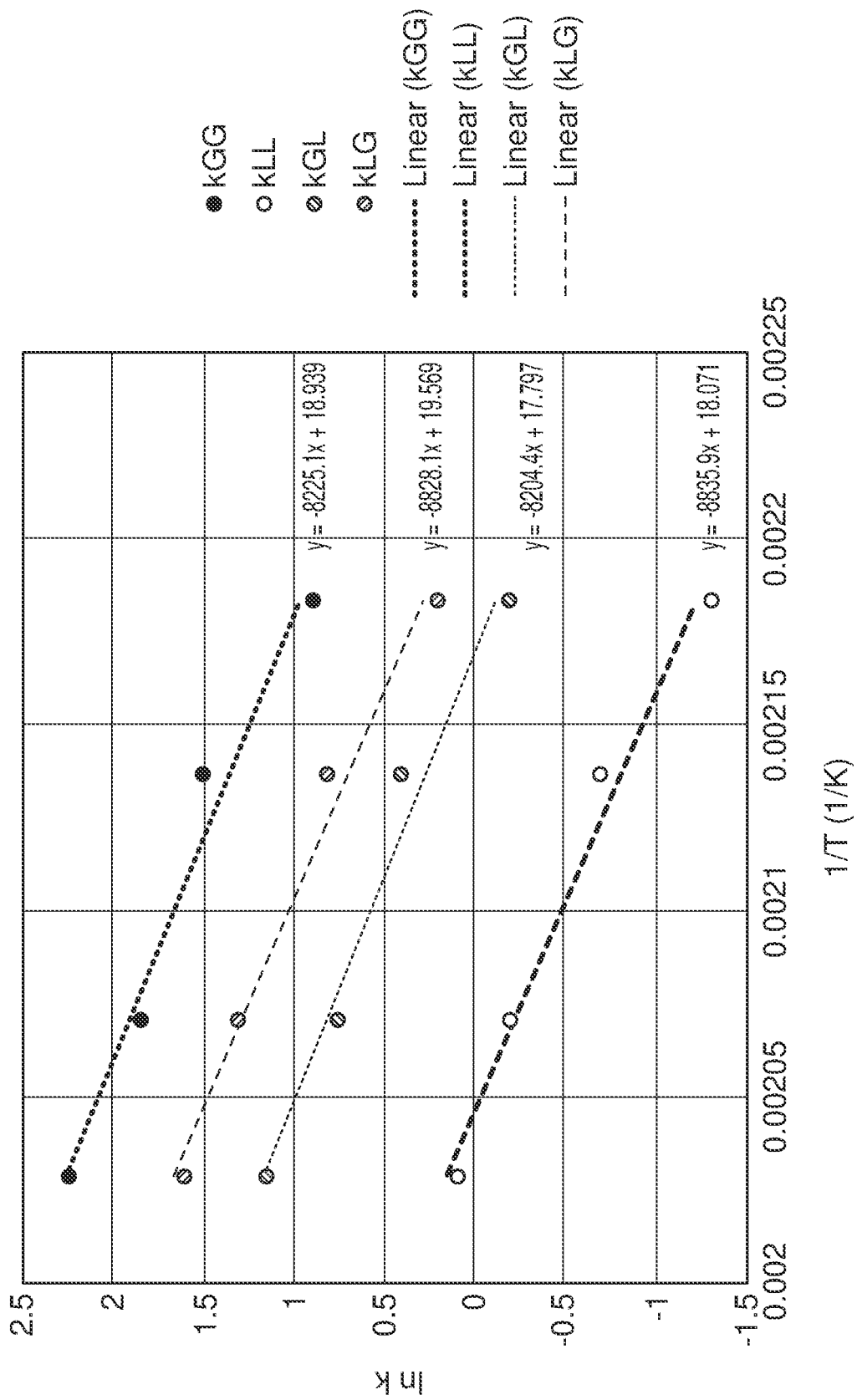
FIG. 9 illustrates an Arrhenius plot where the slope and the intercept provide the Arrhenius constant and the activation energy.

In this equation T is in Kelvin units, R is the ideal gas constant and is 8.314 J/mol·K FIG. 9 demonstrates the Arrhenius plot where the slope and the intercept can give us the Arrhenius constant and the activation energy. The calculated values are presented in Table 4. It is noted that an active L-lactide end group requires ~5 KJ/mol higher energy to continue polymerization compared to an active glycolide end group.

TABLE 4

|  | A | Ea (kJ/mol) |
|---|---|---|
| Glycolide addition to a Glycolide active site (GG) | 1.68E+08 | 68.4 |
| L-lactide addition to a Glycolide active site (GL) | 5.36E+07 | 68.2 |
| Glycolide addition to a L-lactide active site (LG) | 3.15E+08 | 73.4 |
| L-lactide addition to a L-lactide active site (LL) | 7.05E+07 | 73.5 |

Example 1

Continuous Preparation of Glycolide/L-lactide Copolymer 10.87 kg of glycolide, 1.53 kg of L-lactide, 24.3 g of dodecanol and 5.0 mL stannous octoate solution in toluene (126 g/Sn(Oc)$_2$/L solution) were charged into an oil jacketed reactor that is equipped with a helical agitator. The reactor was exposed to multiple vacuum and N$_2$ cycles to remove any moisture from the environment. The reactor jacket was set to a constant 100° C. temperature to melt and homogenize all the ingredients. The bottom drain valve of the reactor was opened to transfer the molten material continuously into a second reactor equipped with oil jacket and helical agitator. The transfer line pipe temperature was kept at between 91-110° C. during the process. The second reactor was operated as a CSTR and the jacket oil temperature was adjusted to maintain the batch temperature at approximately 180° C. The CSTR level was maintained at a level to provide an average 60 mins residence time. At steady state the reactor provided a poly (glycolide-co-L-lactide) (PLGA) copolymer product comprising 69-75% PLGA copolymer and the balance being unreacted glycolide and L-lactide monomers. Glycolide and L-lactide conversions were 71-79%, and 37-42%, respectively. The polymer portion of the PLGA product was composed of 94.6 mol % glycolide and 5.4 mol % L-lactide with 51100 g/mol weight average molecular weight and a PDI of 1.58.

Example 2

Continuous Preparation of Glycolide/L-lactide Copolymer 31.06 kg of glycolide, 4.37 kg of L-lactide, 69.4 g of dodecanol and 9.0 mL stannous octoate solution in toluene (126 g/Sn(Oc)$_2$/L solution) were charged into an oil jacketed reactor that is equipped with a helical agitator. The reactor was exposed to multiple vacuum and N$_2$ cycles to remove any moisture from the environment. The reactor jacket was set to a constant 95° C. temperature to melt and homogenize all the ingredients.

The bottom drain valve of the reactor was opened to transfer the molten material continuously into a second reactor equipped with oil jacket and helical agitator. The liquid temperature in the transfer line was controlled at between 78-84° C. A piston pump was used in the transfer line to provide constant 160 g/min feed into the second reactor. The second reactor was operated as a CSTR and the jacket oil temperature was adjusted to maintain the batch temperature at 170° C. The reacted monomer mixture was taken out of the CSTR at approximately the same rate. Approximately there was 7.2 kg of reactor contents in the CSTR during the process. At steady state the reactor provided a product with 48-62% PLGA copolymer and balance being unreacted glycolide and L-lactide monomers. Glycolide and L-lactide conversions were 51-65%, and 21-29%, respectively. The polymer portion of the product was composed of 95.1 mol % glycolide and 4.9 mol % L-lactide monomer units with 75800 g/mol weight average molecular weight and a PDI of 1.82.

Example 3

Failed Continuous Preparation of Glycolide/L-lactide Copolymer 30.67 kg of glycolide, 4.32 kg of L-lactide, 68.5 g of dodecanol and 14.3 mL stannous octoate solution in toluene (126 g/Sn(Oc)$_2$/L solution) were charged into an oil jacketed reactor that is equipped with a helical agitator. The reactor was exposed to multiple vacuum and N$_2$ cycles to remove any moisture from the environment. The reactor jacket was set to a constant 100° C. temperature to melt and homogenize all the ingredients. The bottom drain valve of the reactor was opened to transfer the molten material continuously into a second reactor equipped with oil jacket and helical agitator. The transfer line pipe temperature was kept at between 99-130° C. during the process. The second reactor was operated as a CSTR and the jacket oil temperature was set to 175° C. After a few mins of monomer mixture flow through the transfer line, the transfer line got blocked. The experiment had to be aborted, due to this blockage.

Example 4

Continuous Polymerization of Glycolide/L-lactide copolymer/unreacted monomer mixture from Example 2 is fed into a plug flow type reactor with melt temperature of 220° C. The residence time of the reactor is 60 min. The product is dumped into trays, cooled, ground and dried. Model kinetics predicts that the polymerization results in 98% glycolide and 72% L-lactide conversion, the PLGA product was composed of 95.9% copolymer, 1.2% glycolide, and 2.9% L-lactide and the weight average molecular weight of the copolymer was 86,000 g/mol with a PDI of 2.2.

Example 5

A continuous polymerization process of glycolide/L-lactide copolymer is carried out as follows. 35.04 kg of glycolide, 4.96 kg L-lactide, 94.4 mL, and 16.32 mL stannous octoate solution in toluene (126 g/Sn(Oc)$_2$/L solution) are loaded into a homogenizer reactor. The ingredients are mixed for 15 min at 110° C. The homogenized mixture is then discharged at a rate of 5 kg/h into a first, low temperature CSTR (CSTR 1) at 150° C. constant batch temperature and with a content-volume of 1.24 L. Two identical homogenizers can work in parallel to feed CSTR 1 alternatively in a batch process.

Alternatively, the homogenizer can also operate continuously similar to a CSTR, if the raw materials are fed continuously. The mixture has 13% glycolide and 6% L-lactide conversion on average at the exit of the CSTR 1. The material flows from the CSTR 1 into a second, high temperature CSTR (CSTR 2) with volume of 1.63 L at the same rate of 5 kg/h. CSTR 2 has a constant controlled batch temperature of 215° C. Model kinetics predicts that the material at the exit of CSTR 2 has 75% glycolide and 43% L-lactide conversion on average. The material from CSTR 2 is discharged into a PFR with a constant batch temperature of 220° C., with a residence time of 50 mins and a rate of 5 kg/h. Model kinetics predicts that the PFR provides monomer conversions of >94% for glycolide and >58% for L-lactide. The PFR is equipped with mixing equipment for high viscosity liquids (>1 million cps), large free volume, fast surface renewability, and good vacuum capability. Model kinetics predicts that the PFR devolatilization capability removes 0.24 kg/h unreacted glycolide and 0.23 kg/h unreacted L-lactide during process and the PFR provides 4.5 kg/h polymer product and the polymer product stream comprises a PLGA copolymer with less than 0.4% residual glycolide and less than 4% residual L-lactide. In all these processes, the equipment is maintained at ambient pressure, except for the devolatilization segment of the PFR, by providing moisture and oxygen-free dry nitrogen or venting off excess pressure.

Example 6

A continuous homogenizer is fed by 195 kg/h glycolide, and 27 kg/h L-lactide by separate continuously feeding hoppers. It is also fed by 0.52 L/h dodecanol and 0.09 L/h stannous octoate solution in toluene (126 g/Sn(Oc)$_2$/L solution) by continuous liquid dispensers. The ingredients are mixed in the homogenizer with an average residence time of 15 min at 105° C. The ingredients are mixed for 15 min at 110° C. The homogenized mixture is then discharged into a first CSTR (CSTR 1) with content-volume of 9.1 gal at a rate of 222 kg/h. The CSTR 1 has a constant controlled batch temperature of 215° C. Model kinetics predicts that the resulting conversions are 56% glycolide and 36% L-lactide conversion on average at the exit of the CSTR 1. The material then flows from the CSTR 1 into a second CSTR (CSTR 2) with constant-volume of 9.4 gal at the same rate of 222 kg/h. Model kinetics predicts that The product at the exit of CSTR 2 has 80% glycolide conversion and 45% L-lactide conversion on average. Model kinetics predicts that the product from CSTR 2 is discharged into a PFR with a constant batch temperature of 215° C., with a residence time of 1.5 hour and a throughput of 222 kg/h and the PFR achieves to provide a polymer exit stream with conversions of >99% glycolide and >78% L-lactide. After the PFR, the material is fed into a horizontal extruder with devolatilization elements and vacuum port to remove residual monomer. The material is then pelletized and collected. Model kinetics predicts that the polymer product stream has <0.4% residual glycolide and <4% residual L-lactide. The devolatilization portion of this process can also be done by the same PFR reactor mentioned above with vacuum, devolatilization capability and large free volume which eliminates the additional devolatilization step. In all these processes, the equipment is maintained at ambient pressure, except for the devolatilization segment, by providing moisture and oxygen free, dry nitrogen or venting off excess pressure.

SUMMARY AND RECOMMENDATIONS

A series of isothermal batch reaction kinetics experiments were performed in order to understand the rate of reaction. In-situ, real-time near infrared measurement and off-line sampling techniques were used to collect reaction conversion, Mw and IV data. A glycolide-lactide copolymerization kinetics model was developed. This model was then used to predict parameters for a continuous polymerization process. The model was then verified by conducting continuous polymerization trials utilizing a homogenizing reactor and CSTR.

We claim:

1. A reaction process for preparing a glycolide/L-lactide copolymer formulation comprising:
   (a) continuously introducing 10-95% glycolide monomer, 5-90% L-lactide monomer, initiator and optionally a catalyst into at least one continuous reactor vessel under dry nitrogen environment, wherein the monomers, initiator, and optional catalyst are mixed at a first lower temperature, in the range of 85-95° C. and then,
   (b) transferring the mixture continuously to a second continuous reactor operating at a second higher temperature-from about 140-230° C., wherein transferring the mixture into the second continuous reactor is performed through a transfer line, having a transfer line temperature in the range of 85-95° C., and then
   (c) exothermally reacting and maintaining at a steady state, the blend of glycolide monomer, lactide monomer, initiator and optional catalyst to produce a PLGA copolymer reaction product,
wherein glycolide, l-lactide, initiator, and optional catalyst are heated and completely melted to a temperature in the range of 85-95° C. in at least two parallel melting vessels and the homogenized contents of the vessels are transferred into the second continuous reactor to provide a continuous flow.

2. The process of claim 1, wherein the second continuous reactor provides a material with >30% conversion of glycolide and L-lactide into PLGA copolymer and the balance being unreacted monomers.

3. The process of claim 1, wherein the second continuous reactor is a continuous stir tank reactor (CSTR) vessel operating at a temperature of 140-230° C.

4. The process of claim 1, wherein the copolymer reaction product is further reacted in a plug flow type of reactor in the temperature range of 200-230° C.

5. The process of claim 3, wherein greater than 98% of the glycolide and greater than 70% of L-lactide monomer reacts to form the copolymer reaction product.

6. The process of claim 3 further comprising the step of further conversion at an elevated temperature and followed by an optional devolatilization step.

7. The process of claim 6 wherein devolatilization is done in a kneader type plug flow reactor (PFR) or in a separate devolatilization extruder or thin film evaporator can be used.

8. The process of claim 7, wherein greater than 90% of the glycolide and greater than 52% of L-lactide monomer reacts to form the copolymer reaction product, and the remaining monomers are removed from the system through devolatilization.

* * * * *